United States Patent [19]

Flautt et al.

[11] 4,347,278

[45] Aug. 31, 1982

[54] POLYTETRAFLUOROETHYLENE FLUOROCARBON RESIN DISPERSION-CONTAINING COATING COMPOSITION FOR GLASS FIBERS, GLASS FIBERS, AND GLASS FIBER FABRIC COATED THEREWITH

[75] Inventors: Martin C. Flautt; Robert Wong, both of Granville; Joseph F. Walsh, Newark, all of Ohio

[73] Assignee: Owens-Corning Fiberglas Corporation, Toledo, Ohio

[21] Appl. No.: 200,675

[22] Filed: Oct. 27, 1980

Related U.S. Application Data

[63] Continuation of Ser. No. 16,265, Feb. 28, 1979, which is a continuation of Ser. No. 773,573, Mar. 2, 1977, abandoned.

[51] Int. Cl.$^3$ .......................... B32B 7/00; D02G 3/00
[52] U.S. Cl. ....................................... 428/288; 65/3.41; 65/3.44; 428/266; 428/268; 428/290; 428/391; 428/392
[58] Field of Search ............... 428/375, 378, 391, 392, 428/422, 290, 289, 288, 273, 268, 266; 65/3.44, 3.1, 3.41

[56] References Cited

U.S. PATENT DOCUMENTS

| | | | |
|---|---|---|---|
| 2,710,266 | 6/1955 | Hochberg | 428/268 |
| 2,754,223 | 7/1956 | Caroselli | 260/29.6 F |
| 2,907,677 | 10/1959 | Hochberg | 428/268 |
| 3,090,701 | 5/1963 | Shulver et al. | 428/392 |
| 3,498,826 | 3/1970 | Caroselli et al. | 428/392 X |
| 3,923,708 | 12/1975 | Furukawa et al. | 428/392 X |
| 4,027,071 | 5/1977 | Motsinger et al. | 428/392 |
| 4,039,716 | 8/1977 | Johnson | 428/378 |

*Primary Examiner*—Lorraine T. Kendell
*Attorney, Agent, or Firm*—Ronald C. Hudgens; Philip R. Cloutier; James B. Wilkens

[57] ABSTRACT

Polytetrafluoroethylene fluorocarbon resin dispersion-containing coatings for glass fibers are disclosed. In one embodiment, the polytetrafluoroethylene fluorocarbon resin dispersion-containing composition also comprises a lubricant and is suitable for use as a padding composition for glass fiber fabric. In another embodiment, the polytetrafluoroethylene fluorocarbon resin dispersion-containing composition also comprises a film-forming polymer, a thixotropic gelling agent, a silane coupling agent and, optionally, a lubricant and is suitable for use as a size composition for glass fibers.

1 Claim, No Drawings

POLYTETRAFLUOROETHYLENE FLUOROCARBON RESIN DISPERSION-CONTAINING COATING COMPOSITION FOR GLASS FIBERS, GLASS FIBERS, AND GLASS FIBER FABRIC COATED THEREWITH

This is a continuation of application Ser. No. 016,265, filed Feb. 28, 1979, which in turn is a continuation of Ser. No. 773,573, filed Mar. 2, 1977, and now abandoned.

This invention relates to coating compositions for glass fibers.

More specifically, this invention relates to coating compositions for glass fibers used to produce industrial fabrics.

In one of its more specific aspects, this invention relates to polytetrafluoroethylene fluorocarbon resin dispersion-containing coatings applicable to glass fibers used to produce industrial fabrics.

The use of glass fibers to produce industrial fabrics such as filtration fabric, architectural fabric, and electrical insulation fabric is well known. Generally, such industrial fabrics are produced by coating fibers at forming with a starch-based size, weaving the resulting fibers into fabric, heat cleaning the fabric to remove the size applied at forming and then applying a padding composition to the fabric.

Ideally, and this is where prior art coatings are deficient, the coatings applied as a size to glass fibers at fiber forming should serve as a finish coating, thus eliminating the need for the heat cleaning process and the subsequent application of a padding composition.

In one embodiment of this invention, the polytetrafluoroethylene fluorocarbon resin dispersion-containing aqueous coating composition also comprises a lubricant, which composition is suitable for use as a padding composition which, when applied to glass fabric, provides fabric which exhibits excellent folding endurance.

In another embodiment of this invention, the polytetrafluoroethylene fluorocarbon resin dispersion-containing aqueous coating composition also comprises a film-forming polymer, a thixotropic gelling agent, an organosilane coupling agent and, optionally, a lubricant, which coating composition is suitable for use as a forming size, which size when applied to glass fibers at forming provides woven fabric which exhibits excellent folding endurance in the absence of heat cleaning and the application of a padding composition.

In yet another embodiment of this invention, the folding endurance of glass fabric can be further improved by sizing glass fibers at forming with a polytetrafluoroethylene fluorocarbon resin dispersion-containing size composition comprising a film-forming polymer, a thixotropic gelling agent, an organosilane coupling agent, and optionally, a lubricant, and then superimposing over the sized glass fiber fabric, in the absence of heat cleaning, a second polytetrafluoroethylene fluorocarbon resin dispersion-containing padding composition, which also comprises a lubricant.

As used herein, the term "padding composition" will mean a coating composition applied to glass fiber fabric after forming and the term "size composition" will mean a coating composition applied to glass fibers at forming.

According to this invention, there is provided at least one glass fiber at least a portion of the surface of which is in contact with a residue formed by removing water from an aqueous composition comprising a polytetrafluoroethylene fluorocarbon resin dispersion and a lubricant selected from the group consisting of a polyethylene oxide/polypropylene oxide copolymer, a dispersible vegetable oil, a polyethylene oxide/polypropylene oxide copolymer containing an ethoxylate fatty ester, a mixture of a polyethylene oxide and a fatty acid ethoxylate, the condensation product of dimethylaminopropylamine and pelargonic acid, an amide substituted polyethyleneamine and an anionic fatty acid long chain derivative, all of the above with or without a quaternary antistatic agent.

This invention also provides an aqueous composition comprising a polytetrafluoroethylene fluorocarbon resin dispersion and a lubricant selected from the group consisting of a polyethylene oxide/polypropylene oxide copolymer, a dispersible vegetable oil, a polyethylene oxide/polypropylene oxide copolymer containing an ethoxylate fatty ester, a mixture of a polyethylene oxide and a fatty acid ethoxylate, the condensation product of dimethylaminopropylamine and pelargonic acid, an amide substituted polyethyleneamine and an anionic fatty acid long chain derivative, all of the above with or without a quaternary antistatic agent.

According to this invention, there is also provided at least one glass fiber at least a portion of the surface of which is in contact with a residue formed by removing water from an aqueous composition comprising polytetrafluoroethylene fluorocarbon resin dispersion, a film-forming polymer, a thixotropic gelling agent, an organosilane coupling agent, and, optionally, a lubricant selected from the group consisting of a polyethylene oxide/polypropylene oxide copolymer, a dispersible vegetable oil, a polyethylene oxide/polypropylene oxide copolymer containing an ethoxylate fatty ester, a mixture of a polyethylene oxide and a fatty acid ethoxylate, the condensation product of dimethylaminopropylamine and pelargonic acid, an amide substituted polyethyleneamine and an anionic fatty acid long chain derivative, all of the above with or without a quaternary antistatic agent.

Also, according to this invention, there is provided an aqueous composition comprising a polytetrafluoroethylene fluorocarbon resin dispersion, a film-forming polymer, a thixotropic gelling agent, an organosilane coupling agent, and, optionally, a lubricant selected from the group consisting of a polyethylene oxide/polypropylene oxide copolymer, a dispersible vegetable oil, a polyethylene oxide/polypropylene oxide copolymer containing an ethoxylate fatty ester, a mixture of a polyethylene oxide and a fatty acid ethoxylate, the condensation product of dimethylaminopropylamine and pelargonic acid, an amide substituted polyethyleneamine and an anionic fatty acid long chain derivative, all of the above with or without a quaternary antistatic agent.

Any suitable polytetrafluoroethylene fluorocarbon resin dispersion can be employed in the coating compositions of this invention.

Particularly suitable polytetrafluoroethylene fluorocarbon resin dispersions are designated "Teflon 30B TFE" and "Teflon 3338" both available from E. I. duPont de Nemours & Co. "Teflon 30B TFE" is a large particle (particle size of from about 0.26 to about 0.28 micron) dispersion having a specific gravity of dispersion (60% solids) value of 1.50, a resin weight (60% solids) of 7.5 pounds per gallon, a melting point of 327°±10° C., a specific gravity (sintered resin) of 2.20 to 2.27 and is white in color. "Teflon 3338" is similar to "Teflon 30B TFE" but has an intermediate particle size (about 0.20 micron) and comprises an organic additive.

Other suitable polytetrafluoroethylene fluorocarbon resin dispersions are designated "Teflon 3337", "Teflon 3379", and "Teflon 30", also available from E. I. duPont de Nemours & Co. U.S. Pat. No. 3,968,297, assigned to E. I. duPont de Nemours & Co., teaches a method for the production of the above identified polytetrafluoroethylene fluorocarbon resin dispersions.

The polytetrafluoroethylene fluorocarbon resin dispersion, if employed in a padding composition will be employed in an amount within the range of from about 20 to about 60 weight percent of the aqueous padding composition; the dispersion, if employed in a size composition, will be employed in an amount within the range of from about 10 to about 60 weight percent of the aqueous size composition.

The coating compositions can also comprise a lubricant. The lubricant will be employed in the padding composition in an amount within the range of from about 4 to about 20 weight percent of the aqueous padding composition. If employed in a size composition, the lubricant will be employed in an amount within the range of from about 0.1 to about 5 weight percent of the aqueous size composition.

Any suitable cationic, anionic, or non-ionic lubricant, or mixture thereof can be employed in the coating compositions.

Particularly suitable cationic lubricants usable in the coating compositions are designated "1618-331" and "1618-335", both available from Quaker Chemical Corporation.

"1618-331" is polyethylene oxide/polypropylene oxide copolymer containing a quaternary antistatic agent.

"1618-335" is a dispersible vegetable oil containing a quaternary antistatic agent.

Other suitable cationic lubricants are designated "1618-611", "1618-671", and "1618-672", also available from Quaker Chemical Corporation and "Emery 6665" and "Emery 6717" available from Emery Industries.

"1618-611" is a polyethylene oxide polypropylene oxide copolymer containing an ethoxylate fatty ester and a quaternary antistatic agent.

"1618-671" is a mixture of a polyethylene oxide and a fatty acid ethoxylate containing a quaternary antistatic agent.

"1618-672" is a mixture of a polyethylene oxide and a fatty acid ethoxylate containing a quaternary antistatic agent.

"Emery 6665" is a cationic condensation product of dimethylaminopropylamine and pelargonic acid.

"Emery 6717" is an amide substituted polyethyleneamine as described in U.S. Pat. No. 3,597,265.

A particularly suitable anionic lubricant is designated "Twitchell 7440" also available from Emery Industries. "Twitchell 7440" is an anionic fatty acid long chain derivative.

In the size composition, any suitable film-forming polymer can be employed. Suitable film-forming polymers include polyacrylates, polyvinyl alcohols, polyvinyl acetates, mixture thereof, and the like.

A particular suitable film-forming polymer is designated "Rhoplex HA-8", commercially available from Rohm & Haas Co. "Rhoplex HA-8" is a self-cross-linking polyethyl acrylate emulsion having a solids content of 45.5%, a pH of 3.0, a Brookfield Viscosity (#3 spindle, 60 rpm) at 25° C. of 550 cps, a torsional modulus of 300 kg/cm² at −14° C., a specific gravity at 25° C. of 1.05, and is non-ionic.

Other particularly suitable film-forming polymers are designated "Rhoplex HA-12" and "Rhoplex HA-16", both commercially available from Rohm & Haas Co.

The film-forming polymer will be employed in the size composition in an amount within the range of from about 2 to about 15 weight percent of the aqueous size composition.

Any suitable thixotropic gelling agent can be employed in the size composition. Suitable thixotropic gelling agents include acid-containing acrylic emulsion copolymers and cellulose ethers.

A particularly suitable acid-containing acrylic emulsion copolymer is designated "Acrysol ASE 108", commercially available from Rohm & Haas Co. "Acrysol ASE 108" has a solids content of 20%, a pH of 2.9, a Brookfield Viscosity (#1 spindle, 12 rpm) at 25° C. of 200 cps, and is anionic.

Other suitable acid-containing acrylic emulsion copolymers are designated "Acrysol ASE 60", "Acrysol ASE 75", and "Acryol ASE 95", all commercially available from Rohm & Haas Co.

Particularly suitable cellulose ethers are methylcellulose, ethylcellulose, hydroxypropyl methylcellulose, mixtures thereof, and the like. The cellulose ethers employable in the coating composition are commercially available from The Dow Chemical Company under the tradename "Methocel".

The thixotropic gelling agent will be employed in the size composition in an amount within the range of from about 0.5 to about 5 weight percent of the aqueous size composition.

Any suitable organosilane coupling agent can be employed in the size composition.

A particularly suitable organosilane coupling agent is designated "C-600", commercially available from Dow Corning. "C-600" has the following chemical formula:

$$CH_3OOCCH_2CH_2NH(CH_2)_2NH(CH_2)_3Si(OCH_3)_3.$$

Other suitable organosilane coupling agents are designated "Z-6020" which is $H_2N(CH_2)_2HN(CH_2)_3Si(OCH_3)_3$ and "Z-2-2023" which is

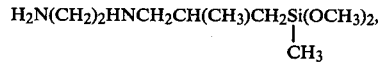

also available from Dow Dorning and "A-1100" gamma-aminopropyltriethoxysilane, available from Union Carbide.

The organosilane coupling agent will be employed in the size composition in an amount within the range of from about 0.1 to about 2 weight percent of the aqueous size composition.

Additionally, if an acid-containing acrylic emulsion copolymer such as "Acrysol ASE 108" is employed as the thixotropic gelling agent in the size composition, it is preferred to introduce into the size composition a suitable base, such as ammonium hydroxide, in order to neutralize the functional groups on the acid-containing acrylic emulsion copolymer. If employed, ammonium hydroxide will be present in an amount within the range of from about 0.1 to about 0.5 weight percent of the aqueous size composition.

Water will comprise the balance of the coating compositions of this invention.

The coating compositions can be prepared by conventional methods such as that described below. The compositions can be applied to any glass fibers conventionally employed to produce industrial fabrics being applied during the forming operation as a size composition using any suitable applicator (e.g. the applicator of U.S. Pat. No. 3,498,262) such that the fibers possess, upon drying, a solids content within the range of from about 0.5 to about 7 percent by weight of the sized fiber as determined by loss on ignition or, if applied to the glass fiber fabric after forming using any method known in the art, such as a dip process, to the extent that the fabric possesses, upon drying, a solids content within the range of from about 2 to about 16 percent by weight of the coated fabric as determined by loss on ignition.

Having described the ingredients usable in this invention, reference is now made to the following examples in which are provided by way of illustration and not by way of limitation of the practice of this invention.

EXAMPLE I

This example demonstrates the best mode for the preparation of approximately 5000 grams of a size composition of this invention.

About 125 grams of "Acrysol ASE 108" and about 1280 grams of demineralized water were added to a main mix tank with stirring at room temperature.

About 12.5 grams of ammonium hydroxide were diluted with an equal amount of demineralized water in a mixing vessel with slow stirring and the contents of the mixing vessel were added to the contents of the main mix tank.

About 400 grams of "Rhoplex HA-8" were diluted with about 240 grams of demineralized water in another mixing vessel with stirring and were then added to the contents of the main mix tank.

About 2500 grams of "Teflon 3338" were added to the contents of the main mix tank with stirring.

About 25 grams of "C-600" were diluted with 400 grams of demineralized water and added to the main mix tank with stirring.

The contents of the main mix tank were recovered as a coating composition of this invention and had a pH of 7.0, a Brookfield Viscosity (#3 spindle, 60 rpm) of 150 cps, and a solids content of 34.2 weight percent.

EXAMPLE II

The size composition of Example I was applied to continuous filament glass fibers having diameters within the range of from 0.00023 to 0.00028 inch using the applicator described in U.S. Pat. No. 3,498,262. The filaments were collected into strands, the strands were twisted, the resulting twisted strands were woven into fabric and the fabric tested and found to have the following properties (Table I) as compared to commercially available prior art fabric produced by heat cleaning and the subsequent application of a padding composition.

TABLE I

| FABRIC SAMPLE | INVENTION I | PRIOR ART |
|---|---|---|
| (1) M.I.T. Folding Endurance (ASTM D-2176)* | | |
| (a) As Prepared | 2,902 | 3,924 |
| (b) Acid Aged | 215 | 1 |
| (c) Heat Aged | 5,380 | 1,740 |
| (d) Heat & Acid Aged | 599 | 4 |
| (2) Tensile Strength (pounds per inch of width) (ASTM D-638) | | |
| (a) As Prepared | 514 | Not Available |
| (b) Acid Aged | 180 | 86 |
| (3) Solids Contents Based Upon Fabric Loss in Ignition (weight Percent) | 5.0 | 7.5 |

*(5 pound load, 0.03 inch mounting head and ½ inch wide sample)

It will be seen from the above data that the size composition of this invention acts to increase the folding endurance and tensile strength of glass fabrics as compared to prior art glass fabric which is heat cleaned and post-coated with a padding composition. It will also be seen that the size composition of this invention achieves these improved property values at a substantially reduced solids content.

EXAMPLE III

This example demonstrates the best mode for the preparation of 1000 grams of a padding composition of this invention.

About 400 grams of water and about 100 grams of Quaker lubricant "1618-311" were added to the main mix tank with agitation at room temperature.

Next, about 500 grams of a polytetrafluoroethylene fluorocarbon resin dispersion "Teflon 3338" were added to the main mix tank with agitation.

The contents of the main mix tank were recovered as a coating composition of this invention and found to have a solids content of about 43% by weight.

EXAMPLE IV

This example demonstrates the preparation of two samples of glass fiber fabric.

Two samples of woven glass fiber fabric were prepared using substantially the same procedures. Both samples were heat cleaned such that each had a fabric size solids content of less than 0.2 as determined by loss on ignition.

A padding composition was applied to each fabric using a dipping process. Fabric A was coated with the padding composition of Example III and Fabric B was coated with a prior art composition containing "Teflon 3338" but no lubricant.

Both samples were air dried and then tested and found to have the following properties (Table II):

TABLE II

| FABRIC SAMPLE | A | B |
|---|---|---|
| (1) M.I.T. Folding Endurance (ASTM D-2176)* | | |
| (a) As Prepared | 68,658 | 4,526 |
| (b) Acid Aged | 0 | 0 |
| (c) Heat Aged | 2,837 | 1,080 |
| (d) Heat & Acid Aged | 0 | 0 |
| (2) Solids Content Based Upon Fabric | | |

TABLE II-continued

| FABRIC SAMPLE | A | B |
| --- | --- | --- |
| Loss On Ignition (weight percent) | 10.94 | 9.28 |

*(5 pound load, 0.03 inch mounting head and ½ inch wide sample)

It will be seen from the above data that the padding compositions of this invention act to increase the "As Prepared" and the "Heat Aged" M.I.T. Folding Endurance values of heat cleaned glass fiber fabric as compared to prior art heat cleaned glass fiber fabric coated with a padding composition not according to this invention.

EXAMPLE V

This example demonstrates the preparation of glass fiber fabric produced by coating glass fibers with a size composition of this invention and then, superimposing a padding composition of this invention over the glass fiber fabric, in the absence of heat cleaning.

Woven glass fiber fabric was prepared using substantially the same procedures of Example II and the size composition of Example I, the fibers possessing, upon drying, a size solids content of about 3.6% by weight of the sized fiber. The resulting fabric was not heat cleaned.

The fabric was then coated with the padding composition of Example III, using a dip process such that the fabric possessed, upon drying, a solids content of about 6.9 percent by weight as determined by loss on ignition. The total solids content of the fabric is the sum of the size solids and the fabric solids, that is, about 10.5 percent by weight of the fabric.

The fabric was tested and found to have the following properties:

TABLE III

|  | Fabric of Example V |
| --- | --- |
| (1) M.I.T. Folding Endurance (ASTM D-2176)* |  |
| (a) As Prepared | 13,120 |
| (b) Acid Aged | 6,698 |
| (c) Heat Aged | 18,366 |
| (d) Heat & Acid Aged | 2,252 |
| (2) Solids Content Based Upon Fabric Loss On Ignition (weight percent) | 10.5 |

*(5 pound load, 0.03 inch mounting head and ½ inch wide sample)

It will be seen from the above data that the successive employment of the two coating compositions (the size composition and the padding composition), of this invention in the production of glass fiber fabric, provides fabric with excellent M.I.T. Folding Endurance values.

It will be evident from the foregoing that various modifications can be made to the present invention. Such, however, are considered as being within the scope of the invention.

What is claimed is:

1. A glass fiber fabric coated with the residue formed by removing water from a padding composition consisting essentially of an aqueous dispersion of polytetrafluoroethylene resin and a lubricant selected from a dispersible vegetable oil, the condensation product of dimethylaminopropylamine with pelargonic acid and an amide-substituted polyethyleneamine, wherein the glass fibers of said fabric are sized with the residue formed by removing water from a sizing composition comprising an aqueous dispersion of polytetrafluoroethylene resin, a film-forming polymer, a thixotropic gelling agent and an organo silane coupling agent.

* * * * *